March 15, 1966     N. R. TAYLOR     3,240,282
RETRACTABLE COMPONENTS FOR GROUND EFFECT VEHICLES
Filed Nov. 9, 1962

INVENTOR
NORMAN RALPH TAYLOR

BY *Larson and Taylor*

ATTORNEYS

United States Patent Office 3,240,282
Patented Mar. 15, 1966

3,240,282
RETRACTABLE COMPONENTS FOR GROUND EFFECT VEHICLES
Norman Ralph Taylor, Cowes, Isle of Wight, Hampshire, England, assignor to Westland Aircraft Limited, Yeovil, Somerset, England
Filed Nov. 9, 1962, Ser. No. 236,674
Claims priority, application Great Britain, Nov. 21, 1961, 41,544/61
12 Claims. (Cl. 180—7)

This invention relates to vehicles, primarily such as ground effect vehicles or boats, but it may also have useful application to aircraft, especially V.T.O.L. aircraft, in the construction of control or airflow directing surfaces or components which require to be retracted or varied in operating surface area, and to flexible inflatable components of this type.

It is a primary object of the invention to provide ground effect vehicles with a retractable flexible construction for components such as fins, side walls, keels, stabilisers, air trunking, ducts, and skirts, for example, such as those described in British Patent 860,781, or United States Patent 3,134,452, in order to vary their depth of extension and, therefore, the stability characteristics of the vehicle according to sea or other conditions prevailing.

It is a further object of the invention to provide the pilot of a ground effect vehicle with the means of varying at will the operative depth of the downwardly-extending flexible stabilising air ducts, which divide the main pressurised air cushion into separate compartments, relatively to the depth of the main ground effect pressurised-air-cushion-generating duct extensions, in order to vary the stability characteristics of the vehicle whilst in operation. Alternatively, the depth of the flexible extensions from the main cushion generating air ducts could be varied relative to the extensions from the stabilising air ducts.

It is a further object of the invention to provide a means by which the settings of the flexible keels, skirts or air duct extensions can be pre-set before "flight" to match the stability characteristics to a predetermined set of wavelength and sea conditions specific to a particular geographical area of operations, in order to provide the best "ride" over the conditions likely to be encountered.

The invention consists of a retractable component for vehicles of the kind set forth according to the present invention, wherein the component is constructed with flexible walls extending from the root anchorage towards the extremity thereof, the root end of the flexible walls in use forming a fixed anchorage so that retraction can be effected by moving the extremity towards the root in such a manner that the flexible walls are caused to be rolled back upon themselves progressively from the root anchorage as retraction progresses, whilst during retraction the extended portion from the root to the extremity retains its functional shape.

In his manner, not only can the operative surface area of the component be varied between a maximum extension and nil, but the component can be retracted into a recess within the structure of the vehicle, which is only half the length of the component measured from the extremity to the root, provided that the part extending from the root to half way to the extremity is hollow.

It will be more readily understood from the detailed description which follows, that each wall has only one bend to make during retraction, that of an inverted U, and that each part of the material is only bent once momentarily during retraction or re-extension, after which it re-assumes a substantially flat form, since the position of the bend progressively changes during the retraction or re-extending movement. This method of retraction has the advantage that no crumpling of the flexible material takes place. Further, the root-anchorage ends of the flexible walls can be, and in all preferred constructions are, rolled back upon themselves before anchorage, and may be moulded to be permanently biassed to retain their shape, so that, upon retraction, the walls are led into the required direction of bend. Crinkling or kinking of the flexible parts can thereby be avoided.

As specified in the appended claims, the invention further comprises in a ground effect vehicle, a rigid base structure, means forming a downwardly directed duct substantially around the periphery of the rigid base structure, a flexible skirting member having inner and outer walls attached to said rigid base structure and extending downwardly therefrom to form a continuation of the downwardly directed peripheral duct, the flexible skirting member being open at its lower edge so as to permit pressurized fluid to pass from the duct downwardly to be discharged from the flexible skirting member at the lower edge thereof, and means for retracting the flexible skirting member upwardly into the downwardly directed duct in the rigid base structure, while maintaining the discharge of pressurized fluid from the flexible skirting member.

The invention further comprises in a ground effect vehicle, a rigid base structure, means forming a duct substantially around the periphery of the rigid base structure, a first flexible skirting member having inner and outer walls attached to the rigid base structure and extending downwardly therefrom to form a continuation of the peripheral duct, the first flexible skirting member being open at its lower edge so as to permit pressurized fluid to pass from the duct downwardly to be discharged from the flexible skirting member at the lower edge thereof, at least one second flexible skirting member extending downwardly from the rigid base structure between spaced points on the first skirting member so as to divide the air cushion enclosed by the first skirting member into a plurality of sub-cushions, and means for adjusting one of the skirting members vertically relative to the other skirting member.

Other and further objects, features, and advantages of the invention will be apparent to those skilled in the art from the description and illustration of an exemplary embodiment.

One embodiment of the invention, as applied, for example, to flexible extensions of the peripheral jets of ground effect vehicles will now be described with reference to the accompanying drawings in which.

Figure 1:
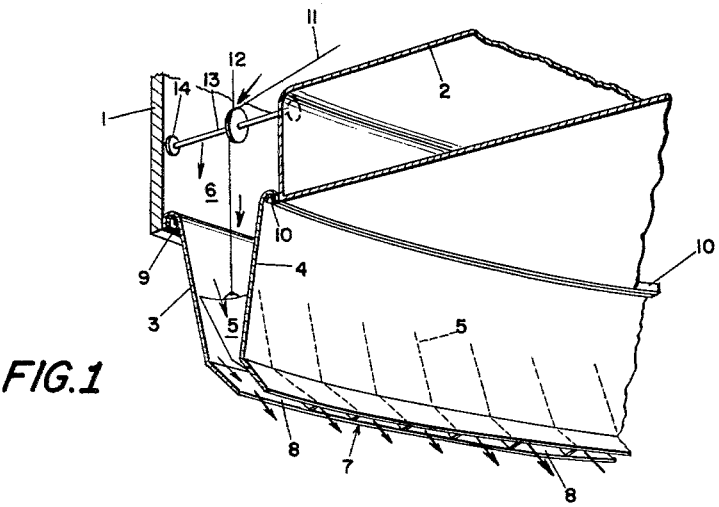
FIGURE 1 is a section through the peripheral duct of a ground effect vehicle substantially on the line I—I of FIGURE 3, showing the flexible component in the extended position, as viewed from beneath looking obliquely aft.

With reference to FIGURE 1 of the drawings, which is a diagrammatic representation of the invention, the numeral 1 indicates the solid side-wall structure of the vehicle, 2 indicates the main base platform and buoyancy tanks, 3 the outer flexible skirt extending downwardly from its attachment point on the solid structure 1, the mating inner skirt 4 extends downwardly from its attachment point on the base platform 2 and is joined to the outer skirt 3 by webs or diaphragms 5. The outer skirt 3 and the inner skirt 4 together form a flexible extension, generally indicated at 7, to the peripheral air duct 6 and may be made of rubber, rubberised fabric, fabric, plastic or like material. The diaphragms 5 are also flexible and of similar material. It will also be apparent from the drawings that the diaphragms 5 extend for half the length of the flexible duct extension 7 only, the upper half being left clear in order to allow for retraction into the peripheral duct 6. In addition to joining the inner and outer skirts 3 and 4 and generally shaping and strengthening the flexible extension 7, the diaphragms 5 also form a means for directing the air flow from the jet nozzle 8 and may be angled aft or vertical as required. The flexible extension 7 may also be tapered from the root to the jet nozzle and angled inwards without affecting the working arrangement of the invention.

In a preferred form of installation the inner and outer flexible skirts 3 and 4 are rolled back upon themselves before being attached to the inside of the walls of the duct 6 by any suitable means such as beading 9 and 10 attached to the solid structure by any suitable means such as rivets, and provided with a generous radius in order to support the component and initiate the roll of the flexible skirts 3 and 4 upon retraction. Retraction can be achieved by means such as wires 11 and pulleys 12 mounted on shaft 13 journaled in bearings 14 at convenient intervals in the duct 6. The wires 11 are attached at one end to suitably strengthened points on the flexible extension 7 such as the diaphragms 5 and at the other to pilot operated actuators, not shown. Alternatively, the flexible component 7 may be biassed to retract, but held extended in consequence of means (not shown) rendered inoperative to allow retraction, thus for example it may be spring loaded and held extended by pressure air or by physical means which when released brings about or permits automatic retraction under influence of the retraction bias.

Figure 3:
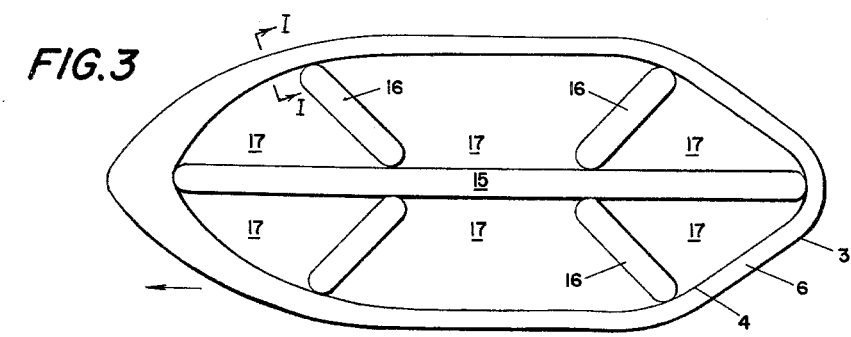
FIGURE 3 is a diagrammatic top plan of a flexible peripheral main skirting and stabilising jet keel arrangement shown removed from the rigid base platform structure of a peripheral jet type ground effect vehicle.

The invention is not confined to the peripheral jet extensions and may be added, either separately or in combination, to a stabilising keel such as that shown at 15 in FIGURE 3, or to stability slots disposed athwartships, dividing the main cushion into compartments similar to those shown at 16 in FIGURE 3.

It will be understood that whether applied to peripheral skirting, and/or to long keel or slot lengths, the flexible extension 7 can be formed of straight lengths for ease of manufacture and secured together end on end in fluid-tight relationship by any suitable means.

Figure 2:
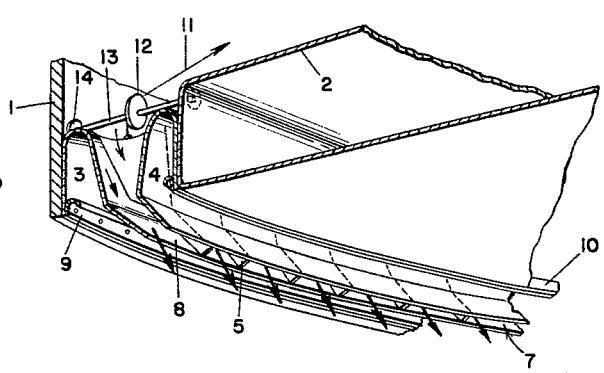
FIGURE 2 is a similar section through the peripheral duct of a ground effect vehicle showing the flexible component in the retracted position.

In operation of the invention it will be understood by those skilled in the art that any truly amphibious ground effect vehicle using flexible duct extensions to increase cushion efficiency, and operational height will be handicapped by the drag from such devices when water taxiing or operating as a boat. Accordingly, the invention provides a method of retraction which will obviate or considerably reduce the drag in this condition. Reference to FIGURE 2 will show the flexible extension 7 in the fully retracted position for water taxiing or operation over very smooth surfaces as a ground effect vehicle. It will also obviate crumpling and, therefore, damage to the flexible components when the vehicle settles on a hard standing, during loading or unloading operations, and should be retracted before "touch down."

In other operational roles the stability characteristics of the vehicle and its performance over various types of seas and terrain will depend to a large extent on the depth the flexible extension 7 depend from the solid structure relative to the depth of extension of the stabilising keels such as those shown at 15 in FIGURE 3, and the stability slots such as those indicated at 16. In this respect, a short term or a long term assessment of the conditions over which the vehicle will be operating are made before "flight," and the flexible extensions 7 can then be adjusted at the vehicle's port, in order to produce the best stability characteristics for the conditions prevailing. For example, the stability slot extensions 16 and the keel 15 could be extended to a depth which is either more or less than the peripheral extensions 7 as required. Alternatively, the invention could be pilot operated, at least as far as the stability keel and slot extensions are concerned, and switches or the like provided in the cockpit to "cut in" actuators which will shorten the cables 11 attached to the flexible portions of the extensions 15 and 16, thereby producing retraction. The clearance between the bottom of the stabilising keels 15 and slots 16 and the surface will determine the cross flows of air from other cushion "compartments," such as those indicated at 17 in FIGURE 3, formed within the main cushion by the extensions 15 and 16, and this in turn will determine the pressure differential between the "compartments 17." Consequently, the pilot will be able to trim the vehicle to affect the "damping" in pitch or roll, in order to achieve the best "ride" possible.

Re-extension of the flexible components after retraction is effected by the inflationary action of the pressure air acting in the tapered jet nozzles 8.

It will also be appreciated that other applications may be possible in connection with air cushion vehicles, boats and vertical take-off aircraft using air cushion "undercarriages," without departing from the scope of the invention.

I claim as my invention:

1. In a ground effect vehicle, a rigid base structure, means forming a downwardly directed duct substantially around the periphery of said rigid base structure, a flexible skirting member having inner and outer walls attached to said rigid base structure and extending downwardly therefrom to form a continuation of said downwardly directed peripheral duct, said flexible skirting member being open at its lower edge so as to permit pressurized fluid to pass from said duct downwardly to be discharged from said flexible skirting member at the lower edge thereof, and means for retracting said flexible skirting member upwardly into said downwardly directed duct in said rigid base structure, while maintaining the discharge of pressurized fluid from said flexible skirting member.

2. Apparatus as set forth in claim 1 further comprising a plurality of flexible diaphragm-like members extending between and connected to the lower portions of said inner and outer walls of said flexible skirting member so as to divide the lower portion of said flexible skirting member into a series of downwardly directed passages, said retracting means comprising means connected to selected ones of said diaphragm-like members for applying an upward force thereto, whereby the inner and outer walls of the skirting member above said diaphragm-like members can flex to at least partially receive the lower portion of said skirt including said diaphragm-like members.

3. Apparatus as set forth in claim 2 wherein said retracting means are connected to the upper portions of selected ones of said diaphragm-like members at points substantially equidistant between said inner and outer walls of said skirting member.

4. Apparatus as set forth in claim 1 wherein at least portions of said inner and outer walls of said skirting members are inclined toward each other.

5. Apparatus as set forth in claim 1 wherein the portions of said inner and outer walls of said skirting member which are attached to the rigid base structure are rolled back for attachment to said base structure so as to face substantially oppositely from the downwardly depending portions of the inner and outer walls to form substantially U-shaped sections, corresponding arms of which are attached to the base structure and the other arms of which depend downwardly to form said continuation, whereby upon retraction the arms of each U will tend to become equal in length.

6. In a ground effect vehicle, a rigid base structure, means forming a duct substantially around the periphery of said rigid based structure, a first flexible skirting member having inner and outer walls attached to said rigid base structure and extending downwardly therefrom to form a continuation of said peripheral duct, said first flexible skirting member being open at its lower edge so as to permit pressurized fluid to pass from said duct downwardly to be discharged from said flexible skirting member at the lower edge thereof, at least one second flexible skirting member extending downwardly from said rigid base structure between spaced points on said first skirting member so as to divide the air cushion enclosed by said first skirting member into a plurality of sub-cushions, and means for adjusting one of said skirting members vertically relative to the other skirting member.

7. Apparatus as set forth in claim 6 wherein said second skirting member is formed with spaced walls defining a passage open at its lower edge so as to permit pressurized fluid to pass downwardly therein to be discharged at the lower edge thereof.

8. In a ground effect machine, a rigid base structure, means forming a downwardly directed duct in said rigid base structure, a flexible skirting member having spaced walls attached to said rigid base structure and extending downwardly therefrom to form a continuation of said downwardly directed duct, said flexible skirting member being open at its lower edge so as to permit pressurized fluid to pass from said duct downwardly to be discharged from said flexible skirting member at the lower edge thereof, and means for retracting said flexible skirting member upwardly into said downwardly directed duct in said rigid base structure by causing said spaced walls to be rolled back upon themselves progressively, whereby discharge of pressurized fluid from said skirting member is maintained during retraction.

9. Apparatus as set forth in claim 8 wherein the spaced walls of said skirting member are inclined inwardly toward each other over at least part of their lengths.

10. Apparatus as set forth in claim 9 wherein said retracting means acts upon said skirt at points below the rigid base structure, and wherein said inwardly inclined portions of the spaced walls are located at least partially above said points.

11. Apparatus as set forth in claim 8 wherein the upper edge portions of said spaced walls are turned back upon themselves outwardly from the duct continuation defined therebetween to form substantially U-shaped sections along the upper portions of the spaced walls, the outer arms of said U-shaped sections being attached to the side walls of said downwardly directed duct, whereby said flexible skirting member can be retracted into said duct by said spaced walls progressively folding back upon themselves to progressively increase the length of the arms which are attached to the side walls of said duct.

12. Apparatus as set forth in claim 11 further comprising a plurality of flexible diaphragm-like members extending between and connected to the lower portions of said spaced walls to divide the space encompassed thereby into a series of adjacent downwardly direct passages, the portions of said spaced walls above said diaphragm-like members being at least equal in length to the portions containing said diaphragm-like members.

References Cited by the Examiner

UNITED STATES PATENTS

| 1,123,589 | 1/1915 | Porter | 180—7 |
| 1,698,482 | 1/1929 | Nicin | 180—7 |
| 2,645,436 | 7/1953 | Brown | 180—7 |
| 3,027,860 | 4/1962 | Priest | 180—7 |
| 3,073,549 | 1/1963 | Griffith | 180—7 |

FOREIGN PATENTS 860,781   2/1961   Great Britain.

MILTON BUCHLER, *Primary Examiner.*

PHILIP ARNOLD, *Examiner.*